United States Patent [19]
Ishibashi et al.

[11] Patent Number: 4,761,774
[45] Date of Patent: Aug. 2, 1988

[54] OPTICAL DISC DRIVE APPARATUS

[75] Inventors: Hiromichi Ishibashi, Toyonaka; Shinichi Tanaka, Kyoto; Ryosuke Shimizu, Yawata; Makoto Kuwamoto, Katano; Hajime Yamamoto, Hirakata, all of Japan

[73] Assignee: Matsushita Electric Industrial Co., Ltd., Osaka, Japan

[21] Appl. No.: 866,584

[22] Filed: May 23, 1986

[30] Foreign Application Priority Data

May 30, 1985 [JP] Japan .................. 60-116906
Feb. 17, 1986 [JP] Japan .................. 61-32327

[51] Int. Cl.⁴ .......................... G11B 7/095
[52] U.S. Cl. .................. 369/44; 369/112; 369/222
[58] Field of Search .................. 369/44–46, 369/111, 100, 112, 219, 222; 250/201

[56] References Cited

U.S. PATENT DOCUMENTS

| | | | |
|---|---|---|---|
| 3,944,727 | 3/1976 | Elliott | 369/44 |
| 4,004,081 | 1/1977 | Zorn | 369/111 |
| 4,260,858 | 4/1981 | Beiser | 369/111 |
| 4,295,162 | 10/1981 | Carlsen | 369/111 |
| 4,451,913 | 5/1984 | Elliott | 369/111 |
| 4,473,274 | 9/1984 | Yano et al. | 369/44 |
| 4,574,371 | 3/1986 | Takemura et al. | 369/45 |
| 4,669,073 | 5/1987 | Wakabayashi et al. | 369/45 |

FOREIGN PATENT DOCUMENTS

58-53035 3/1983 Japan .
58-91536 5/1983 Japan .

Primary Examiner—Donald McElheny, Jr.
Attorney, Agent, or Firm—Wenderoth, Lind & Ponack

[57] ABSTRACT

An optical disc drive apparatus has a remarkably improved track accessing ability in comparison with conventional like apparatus. On a base are provided an optical system having a light emitting element and a light sensing element, as well as an optical path deflecting element which performs a precision tracking. Further, an objective lens and a light guide element are provided on a rotating element which performs track seek and rough tracking. The light guide element comprises two reflecting members which are opposed in parallel with each other.

19 Claims, 10 Drawing Sheets

OPTICAL DISC DRIVE APPARATUS

BACKGROUND OF THE INVENTION

1. Field of the Invention

The present invention relates to an optical disc drive apparatus for recording or reproducing information using an optical disc as a recording medium.

2. Description of the Prior Art

There has heretofore been known such an apparatus as disclosed in Japanese Laid-Open Patent Application No. 58-91536, in which information is recorded along a track with a stroke width of several μm formed on an optical disc. To this end it is necessary to focus a laser beam to a spot by means of an objective lens and apply the spot onto the track accurately. Thus, it is necessary to effect an accurate tracking control. In order to achieve this object it has heretofore been necessary to construct an optical disc drive apparatus with a rough actuator and a fine actuator provided on the rough actuator.

The recording density of an optical disc is about 10 to 100 times higher than that of a magnetic disc. In a comparison of 5-inch one-side discs, a replaceable floppy disc has a memory capacity of about 1MB and a fixed type disc for Winchester drives has a memory capacity of about 10MB, while an optical disc has a memory capacity of about 200MB or even more.

Therefore, an optical disc is so formed as to have a fairly fine track width as compared with that of a magnetic disc, and consequently the accuracy in positioning a laser beam which corresponds to a recording/reproducing head, relative to the track, becomes more strict than that in a magnetic disc apparatus. The track width of a floppy disc is about 500 μm and that of a fixed type disc about several ten μm, while that of an optical disc is at most 2 μm. Positioning a laser beam spot of about 1 μm in diameter accurately onto such a fine track is difficult if positioning means used the for the magnetic disc is used. Besides, since the optical disc, like the floppy disc, is used as a replaceable medium, there occurs a positional error at the time of disc change, with the result that the track does not rotate circularly but rotates eccentrically unlike the rotation of the fixed disc.

Generally, in an optical disc drive apparatus, the position of a laser beam spot relative to a track is corrected using a feedback control, thereby permitting recording or reproduction along the track. To this end, the conventional optical disc drive apparatus is provided with two-stage actuators, namely a rough actuator and a fine actuator.

The rough actuator has a function similar to that of the positioning means for the magnetic disc drive apparatus, in which the laser beam spot is positioned using a mechanical means. The fine actuator is provided on the rough actuator for shifting the laser beam accurately within a specified range and correcting a positional error of the rough actuator.

In such a conventional optical disc drive apparatus, however, the operation for moving the laser beam from one track to another, namely track seek, has been inferior to that of the magnetic disc drive apparatus. In the magnetic disc drive apparatus, what is required is merely moving a recording/reproducing head by means of a positioning mechanism, while in the conventional optical disc drive apparatus the fine actuator must be moved by the rough actuator as mentioned above. The mass of the recording/reproducing head of the magnetic disc drive apparatus is several grams at most, but that of the fine actuator is inevitably several ten grams or more because it carries thereon optical components, e.g. a galvanomirror, for scanning the laser beam. Consequently, the speed of track seek becomes lower in proportion to the increase in conveyance mass. Of more importance is that the precision actuator is a precise and fragile component. Even if the rough actuator will be unable to withstand a large acceleration induced at that time.

There has also been proposed an optical disc drive apparatus without the precision actuator as disclosed, for example, in Japanese Laid-Open Patent Application No. 58-53035, in which an optical head is mounted near the fore end of a rotary actuator. Generally speaking, the positioning accuracy of a rotary actuator is higher than that of a linear actuator. A rotation support mechanism constituted by bearings and a shaft can be sealed hermetically and therefore dust or the like does not adhere thereto, thus permitting a smoother operation than the linear structure. Thus, the rotary actuator can function as both rough and precision actuators.

However, the rotary actuator has such drawbacks that a mechanical resonance is apt to occur as compared with the linear actuator and that therefore it is impossible to increase the response frequency of a tracking servo system and hence it is impossible to increase the number of rotations of the disc. Consequently, the use of an optical disc drive apparatus having such a structure is restricted to the case where the optical disc is rotated at low speed, for example, for digital audio.

SUMMARY OF THE INVENTION

It is an object of the present invention to eliminate the above-described drawbacks of the prior art and to provide an optical disc drive apparatus having a track seeking ability equal to that of a magnetic disc drive apparatus.

According to the present invention, in order to achieve the above object, there are disposed on a fixed base a rotating means for moving an objective lens arcuately, an optical system including light emitting means and light sensing means, and an optical path deflecting means for deflecting at a slight angle the direction of a light beam travelling from the optical system toward the objective lens. An important point is that the optical path deflecting means which performs a fine tracking is disposed on the fixed base, but not on the rotating means which performs a rough tracking.

In the above construction, the conveyance mass during track seek can be reduced and as a result it is possible to achieve a track seeking ability comparable to that of a magnetic disc drive apparatus.

DESCRIPTION OF PREFERRED EMBODIMENTS

Figure 1:
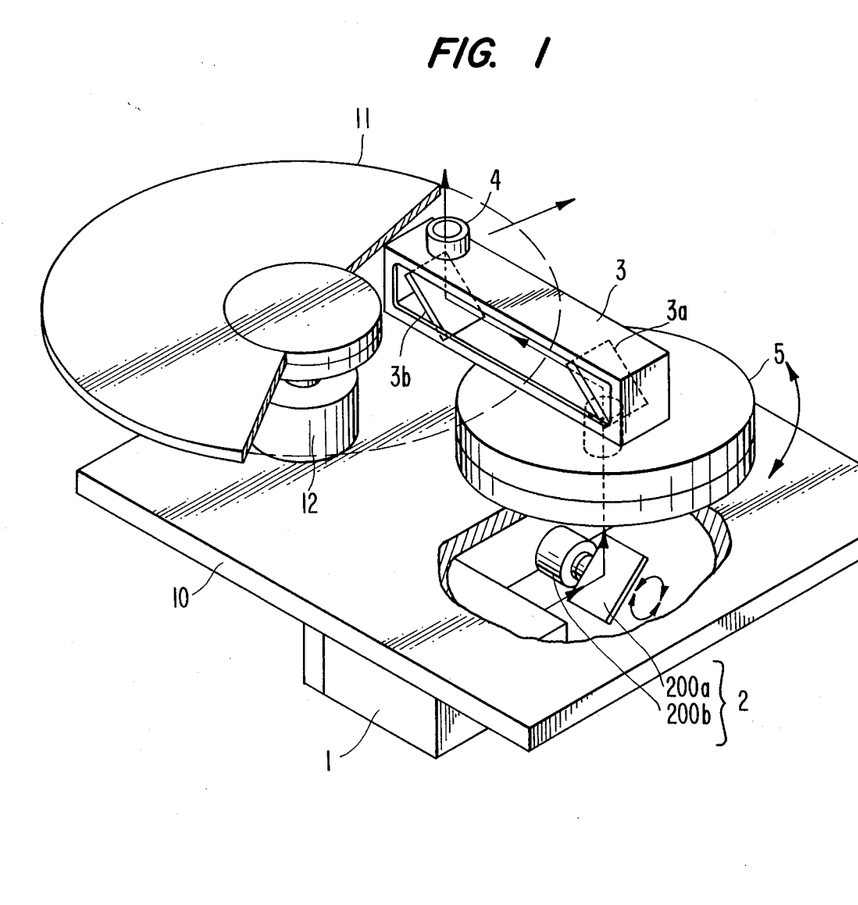
FIG. 1 is a perspective view of an optical disc drive apparatus according to a first embodiment of the present invention.

Referring first to FIG. 1, there is illustrated an optical disc drive apparatus according to an embodiment of the present invention, in which a light beam emitted from an optical system 1 passes through an optical path deflecting means 2, a light guide means 3 and objective lens 4 to focus on the surface of an optical disc 11. The light guide means 3 and the objective lens 4 are provided on a rotating means 5, while the optical system 1, optical path deflecting means 2 and rotating means 5 are provided on a base 10. The optical disc 11 is mounted on a spindle motor 12 which is provided on the base 10. The optical system 1 includes a laser beam source such as a light emitting means, a photo detector as a light sensing means, a beam splitting means for optically separating the two, and a lens system for focusing and diverging a laser beam. The optical path deflecting means 2 is constituted by a galvanomirror comprising a mirror 200a and a rotator in the form of a motor 200b. With rotation of the rotating means 5, the objective lens 4 moves along a path in the form of a circular arc approximately in a radial direction of the optical disc 11. The rotating means 5 has a rotational shaft which is either hollow or formed of a transparent material at its axis or thereabouts, thereby permitting a light beam to pass through the rotational shaft. The light guide means 3 is composed of two reflecting members 3a and 3b which are opposed to each other in parallel.

Figure 2:
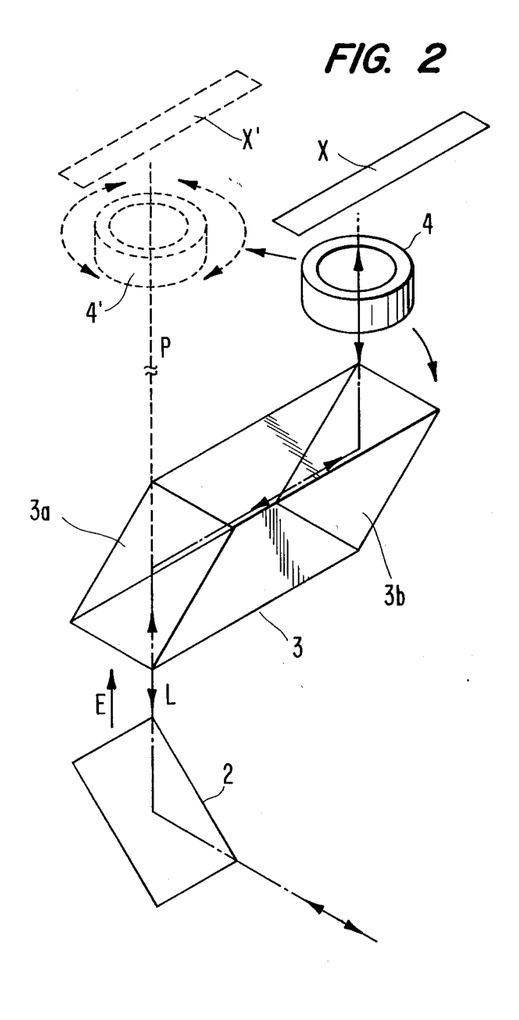
FIG. 2 is a diagrammatic explanatory view showing an example of a light guide means used in the first embodiment and its operation.

FIG. 2 shows an example of the light guide means 3 and its operation, in which a light beam incident on the light guide means 3 is reflected by the two reflecting members 3a and 3b opposed to each other in parallel and reaches the objective lens 4. Since the reflecting members 3a and 3b are parallel to each other, light incident on the reflecting member 3a and light leaving the reflecting member 3b are parallel to each other. In other words, when the light guide means 3 is seen from the reflecting member 3a side (arrow E in the figure), an image 4' of the objective lens 4 is seen as if it were located on the other side of the reflecting member 3a and in parallel with the actual objective lens 4. With rotation of the rotating means 5, the light guide means 3 and the objective lens 4 also rotate. The objective lens 4 per se moves arcuately along the radius of the optical disc 11 as previously noted. at this time, the image 4' looks like an image rotating about a rotational axis P of the rotating means 5. If the optical axis of the light incident on the light guide means 3 is aligned with the rotational axis P and the optical axis of the light leaving the light guide means 3 is aligned with the optical axis of the objective lens 4, the image 4' will appear to rotated in a stationary state on the rotational axis P. In other words, even if the objective lens 4 per se performs an arcuate rotational motion, it is optically seen as being in a stationary condition. Further, an image X; of a track X seen through the objective lens 4 is also projected in parallel with the track X. Optically, this is almost equal to the movement on a straight line of the objective lens 4.

Figure 3:
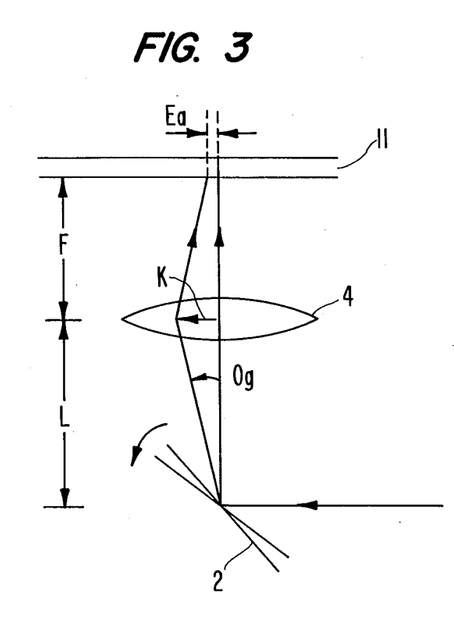
FIG. 3 is a diagrammatic explanatory view showing the operation of an optical path deflecting means used in the first embodiment.

From the above it is seen that the light guide means 3 constituted by the two reflecting members 3a and 3b which are opposed to each other in parallel, has an influence merely in terms of an optical distance. Consequently, an optical positional relation between the optical deflecting means 2 and the objective lens 4 is as shown equivalently in FIG. 3. The reference character L designates an optical distance between the optical path deflecting means 2 and the objective lens 4 and the character F designates the focal length of the objective lens 4. When a light beam is deflected at a slight angle $\Theta g$ by the optical path deflecting means 2, the position of a focused light spot on the optical disc 11 shifts by $\epsilon_a$. From an optical standpoint, the relation of the two is described as follows:

$$\epsilon_a = \Theta g \text{ (radian)} XF = 0.017 \ \theta g \text{ (degree)} XF \quad (1)$$

From the above, the role of the optical path deflecting means 2 and that of the rotating means 5 are apparent. The optical path deflecting means 2 and the rotating means 5 correspond to a fine actuator and a rough actuator, respectively, in the prior art. In other words, track seek and rough tracking are performed by moving the objective lens 4 arcuately with the rotating means 5, while fine tracking is effected by the optical path deflecting means 2.

With this construction, the conveyance mass during track seek can be diminished to a remarkable extent as compared with that in the prior art. More particularly, in this embodiment it is only the objective lens 4 and the light guide means 3 that must be conveyed during track seek because the optical path deflecting means 2 which corresponds to the fine actuator is fixed to the base 10. It may appear that the conveyance mass is not reduced because of the provision of the light guide means 3 which is in addition to the structure used heretofore. Actually, however, it is only the reflecting member 3b provided on the end toward the objective lens 4 and some components which hold the reflecting member that have an influence on the conveyance mass. This is one of great features of a rotary actuator. It is not that the force required for rotating an object is merely proportional to the mass inherent in the object. It is proportional to the product of the mass inherent in the object and the square of the radius of rotation, namely, the moment of inertia. In other words, the moment of inertia means a substantial mass in rotational motion. In this embodiment, while the reflecting member 3b and the objective lens 4 are positioned near the outermost periphery of the rotational motion, the moment of inertia of the reflecting member 3a positioned near the rotational axis can be regarded as being almost zero. Further, if the motor portion of the rotating means 5 which provides a driving force to the light guide means 3 and objective lens 4 is also disposed near the rotational axis, its moment of inertia can be diminished. As a result, the substantial mass which the rotating means 5 must carry becomes smaller as a whole. More particularly, when an optimum design is made for the apparatus, including the movable part of the motor and a shaft or the like for transmitting the driving force of the motor to the objective lens 4, the conveyance mass of the rotary actuator can be reduced to one third of that of the linear actuator.

Another advantage of the rotary system is that since the rotation support mechanism constituted by bearings and shaft can be sealed hermetically, dust or the like does not adhere thereto, thus permitting a smoother operation than the linear structure. As a result, the track follow-up performance of the rotating means 5 is improved and the follow-up range covered by the optical path deflecting means 2 is smaller than that in the prior art. This permits the optical path deflecting means to be disposed near a rotational shaft located far away from the objective lens which deflecting means has heretofore been required to be disposed near the objective lens, as will be described hereinafter.

A precision tracking can be effected by slightly deflecting the light beam incident on the objective lens 4 and this is as previously noted. But in this case there arises the problem of a slight deviation of the optical axis. More particularly, the light beam incident on the objective lens 4 deviates by K:

$$K = \theta g \text{ (radian)} XL = 0.017 \theta g \text{ (degree)} XL \quad (2)$$

In other words, the objective lens 4 deviates by $-K$ from the optical axis at this time. The occurrence of such an optical axis deviation affects the focus control and tracking control. The degree of influence differs depending on how the control signal is detected, but generally speaking, the optical axis deviation must be one twentieth or less of the radius of the objective lens. Since the radius of the lens usually employed is about 2 mm and the focal length thereof is about 4 mm (NA=0.5), the optical axis deviation must be at most 100 μm. If L is 5 cm, $\theta_g$ is equal to 0.12° from the equation 2. At this time, from the equation 1, the amount of movement of the light spot is:

$$\epsilon_a = 8 \ \mu m \quad (3)$$

Therefore, if the optical path deflecting means 2 and the rotating means 5 are controlled so that $\epsilon_a$ becomes not larger than 8 μm, there will not occur any optical problem. In other words, if the rotating means 5 can follow the eccentricity of a track at a spot movement not larger than 8 μm, a fine tracking can be done by the optical path deflecting means 2 while suppressing an optical axis deviation within an allowable range. In the case of a rotary actuator, follow-up at that accuracy can be done to a satisfactory extent. In using a rotary actuator, its mechanical resonance may cause a problem, but this fear is eliminated by controlling the optical path deflecting means 2 and the rotating means 5 in the manner described below.

Figure 4:
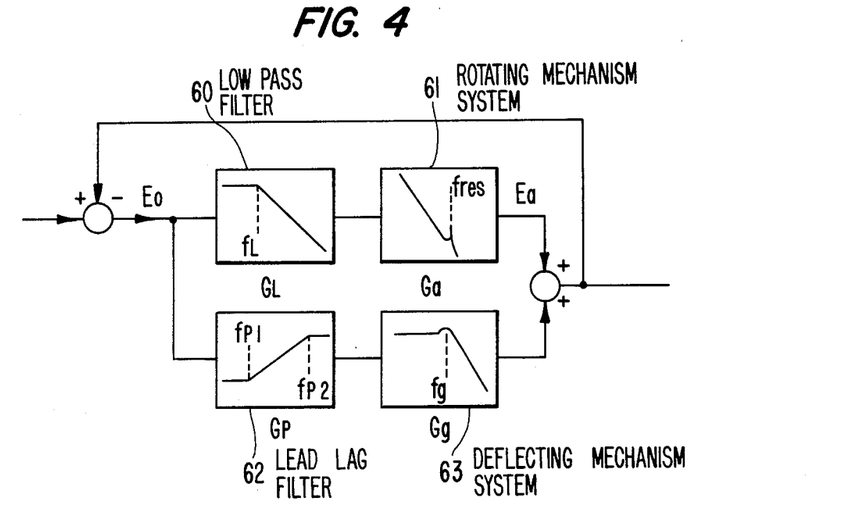
FIG. 4 is a block diagram of a control system used in the first embodiment.

Referring now to FIG. 4, there is illustrated in block diagram a control system used in this embodiment, the frequency characteristics of the parts thereof being shown schematically, and in which the number 60 denotes a primary low pass filter having a cut-off frequency $f_L$. Numeral 61 represents a rotating mechanism system including the light guide means 3, objective lens 4 and rotating means 5, which is a quadratic integral system having a mechanical resonance frequency $f_{res}$. Numeral 62 denotes a filter (lead lag filter) which advances the phase of the frequency band between $f_{p1}$ and $f_{p2}$. Numeral 63 denotes a deflecting mechanism system which is assumed to be analogous to a spring-mass system. Further the first order resonance frequency is assumed to be $f_g$. If transfer functions of the four components described above are $G_L$, Ga, Gp and Gg, an open loop gain of the tracking control system is given as:

$$G = G_L \cdot G_a + G_p \cdot G_g \quad (4)$$

Figure 5:
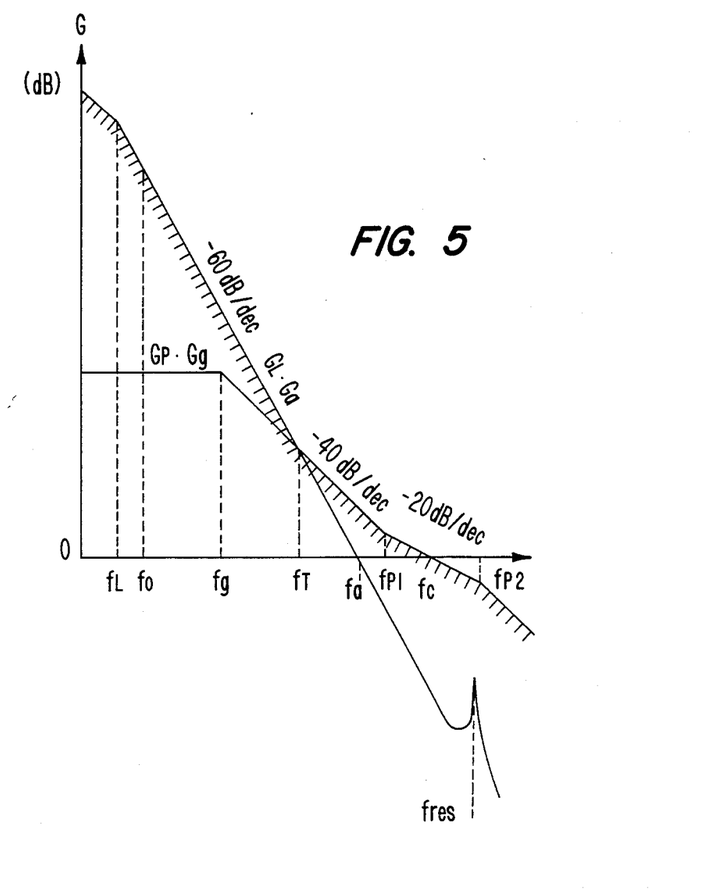
FIGS. 5, 6 and 7 are graphs showing transfer characteristics of the control system of FIG. 4.

This is shown in FIG. 5, from which it is seen that in the frequency band higher than $f_T$, Gp·Gg, namely, the control system for the rotating mechanism system, mainly acts, while in the frequency band lower than $f_T$, $G_L \cdot G_a$, namely, the control system for the deflecting mechanism system 63, mainly acts. The frequency $f_T$ represents a crossover frequency between these two control systems.

The operation of this tracking control system is explained as follows. If the number of rotations per unit time of the optical disc 11 is $f_o$ and the amount of eccentricity at that time is $\delta$, the follow-up error $\epsilon_o$ of the entire system is:

$$\epsilon_o = \frac{\delta}{G+1} \approx \frac{\delta}{G_L \cdot G_a} \quad 5$$

Provided $f_o < < f_T$. A follow-up error $\epsilon a$ of the rotation mechanism system 61 is given as:

$$\epsilon_a = \frac{G_p \cdot G_g}{G_L \cdot G_a} \delta \quad 6$$

Thus, with respect to the amount of eccentricity $\delta$, the rotating mechanism system 61 cancels $\delta - \epsilon_a$ and the deflecting mechanism 63 cancels $\epsilon_a - \epsilon_o$, with the result that the residual may be considered to be:

$$\delta - (\delta - \epsilon_a) - (\epsilon_a - \epsilon_o) = \epsilon_o$$

The equations (5) and (6) can be expressed as follows using $f_o$, $f_g$, $f_T$ and $f_a$ (frequency at $|G_L \cdot G_a| = 1$):

$$\epsilon_o = \left(\frac{f_o}{f_a}\right) 3 \ \delta \quad 7$$

$$\epsilon_a = \frac{f_g}{f_T} \cdot \left(\frac{f_o}{f_g}\right) 3 \ \delta \quad 8$$

$G_L \cdot G_a$ and $G_p \cdot G_g$ must cross with a phase difference smaller than 180° at the crossover frequency therebetween. This is for the following reason. When the path including $G_L \cdot G_a$ is cut, an open loop gain is given as:

$$\frac{G_L \cdot G_a}{G_p \cdot G_g + 1} \approx \frac{G_L \cdot G_a}{G_p \cdot G_g}$$

Unless a suitable phase margin is ensured at the crossover frequency of this open loop gain, it will be impossible to obtain stability of the rotating mechanism system 61. This condition is satisfied by setting $f_g$, $f_T$ and $f_{p1}$ as follows:

$$f_g < f_T < f_{p1} \tag{9}$$

Also at the crossover frequency of the entire tracking control system it is necessary to ensure a phase margin which corresponds to a phase lag less than 180°. The filter 62 is for achieving this and it functions to advance the phase of the region surrounded with the frequencies $f_{p1}$ and $f_{p2}$. As an example, a crossover frequency $f_c$ is set as follows:

$$f_c = \sqrt{f_{p1} \cdot f_{p2}} \tag{10}$$

$$f_{p2} = 10 \times f_{p1} \tag{11}$$

An example of numerical values will be shown hereinafter. Parameters indicative of characteristics of the tracking control system are set as follows:

$f_a = 630$ Hz $f_T = 240$ Hz $f_g = 130$ Hz $f_c = 1.8$ kHz $f_{p1} = 570$ Hz $f_{P2} = 5.7$ kHz $f_o = 30$ Hz

Figure 6:
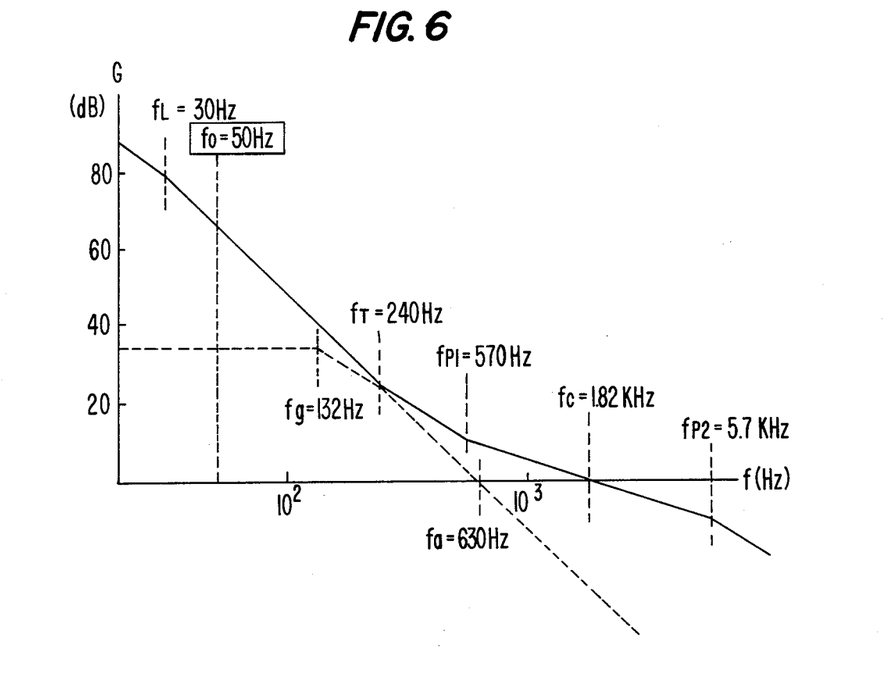

At this time, the transfer characteristic of the tracking control system is as shown in FIG. 6. This example of numerical values satisfies the foregoing stabilizing conditions.

A study will now be made of the follow-up residual in this tracking control system. As an example, it is here assumed that an optical disc having an amount of eccentricity (δ) of 100 μm is rotating at 3000 rpm ($f_o = 50$ Hz). The follow-up residual $\epsilon_o = 0.05$ μm from the equation 7. Further, the follow-up residual of the rotating mechanism system 61 (rough tracking) is determined as $\epsilon_a = 3$ μm from the equation 8. Thus, the control system can follow, with an accuracy of 0.05 μm, the tracks of the optical disc which is rotating at 3000 rpm with an amount of eccentricity of 100 μm.

Figure 7:
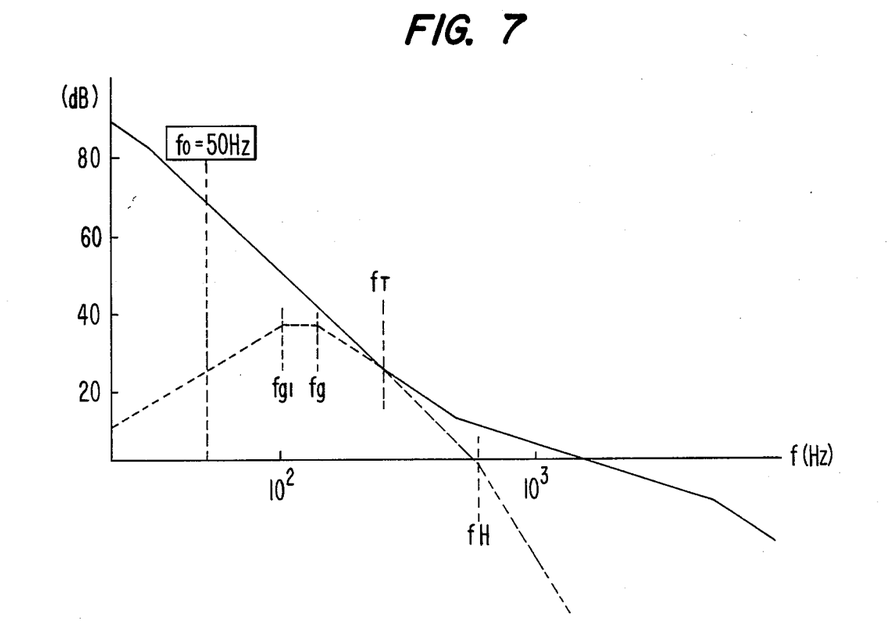

In the case where the rotating mechanism system 61 undergoes a resonance of frequency fres=3 kHz, the gain $G_L \cdot G_a$ of the control system including the rotating mechanism system 61 is −60 dB/dec at $f \geq f_L$, thus showing an abrupt drop, and $G_L \cdot G_a$ is about −40 dB at f=3 kHz. Therefore, if the quality factor (Q) at the resonance point is sufficiently smaller than 100, the resultant influence is ignored. Further, if it is to such a degree as does not affect the phase of $G_L \cdot G_a$ at $f = f_T$ (crossover frequency between $G_L \cdot G_a$ and $G_p \cdot G_g$), then by inserting a low pass filter from $f > f_H (> f_T)$ to drop the gain of the control system for the rotating mechanism system 61 at −80 dB/dec or at a steeper gradient, it is possible to further increase the tolerance for mechanical resonance (FIG. 7).

Now, the off-axis position of the light incident on the objective lens 4 will be considered. In this design, $\epsilon_a$ (MAX)=3 μm, so at this time the optical axis inclines by $\Theta g = 0.044°$ according to the equation (1), resulting in a deviation of K=37.5 μm according to the equation (2). F and L in the equations (1) and (2) were assumed to be 4 mm and 50 mm, respectively. The radius of the objective lens 4 is 2 mm provided NA=0.5, so after all there occurs an off-axis condition of 0.0375/2=2% relative to the objective lens, but such a degree of off-axis position scarcely causes a problem. Further, $\epsilon_a$ can be made still smaller. More particularly, from the frequency of $f_{gL} < f_g (< f_T)$ there may be inserted in the deflecting mechanism system 63 a high pass filter which cuts off the low frequency region, to thereby drop the gain of the deflecting mechanism system 63 (FIG. 7). This is because $\epsilon_a$ is determined by the ratio of the gain of the rotating mechanism system 61 to that of the deflecting mechanism system 63.

Figure 8:
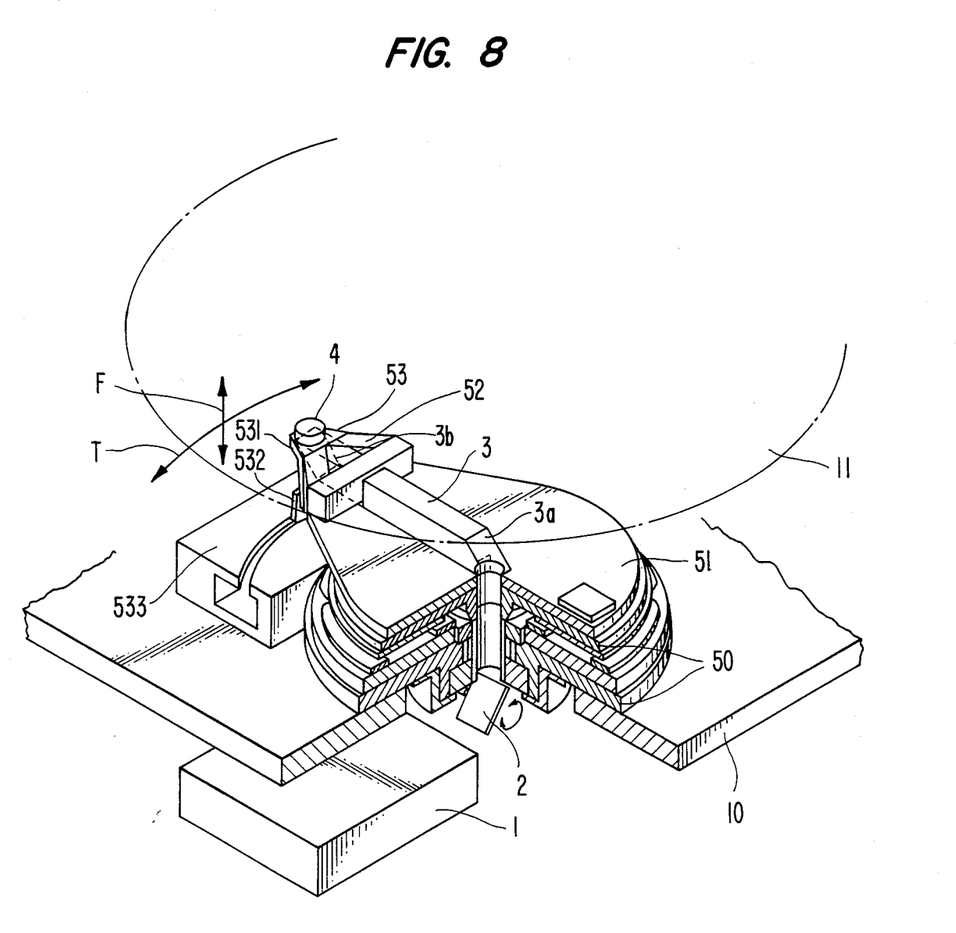
FIG. 8 is a perspective view of an optical disc drive apparatus according to a second embodiment of the present invention.

Referring now to FIG. 8, there is illustrated an optical disc drive apparatus according to a second embodiment of the present invention, in which a rotating means 5 is composed of a motor portion 50, a swing arm portion 51, a focus suspension 52 and an objective lens holder portion 53. An objective lens 4 is provided on the objective lens holder portion 53 which is attached to the swing arm portion 51 through the focus suspension 52. A light guide means 3 is also fixed onto the swing arm portion 51. The objective lens holder portion 53 is composed of a holder 531 which is a connection member between the objective lens 4 and the focus suspension 52, and a focusing direction drive motor 532. Further, the light guide means 3 is constituted by a parallelogrammic prism having two reflecting members 3a and 3b which are opposed in parallel with each other. The reflecting members 3a and 3b are formed by total reflection surfaces of the prism.

The operation of this embodiment thus constructed will now be described. This embodiment adds a focus follow-up mechanism to the foregoing first embodiment. Generally, in an optical disc drive apparatus, the position of a concentrated beam must be controlled at least in two directions which are the tracking direction (T in the figure) and the focusing direction (F in the figure). The control in the tracking direction is as described above. The control in the focusing direction will now be explained briefly. In order to write dots each about 1 μm in diameter onto an optical disc and reproduce them accurately as information, it is necessary that a light beam concentrated through the objective lens be focused on the recording surface of the optical disc with an accuracy of 1 μm or less. Since the optical disc includes a machining error not only in the tracking direction but also in the focusing direction, there occurs a strong surface vibration during rotation of the optical disc. It is therefore necessary to keep constant the relative distance (focal length) between the optical disc and the objective lens, namely, the so-called focusing control.

Figure 9:
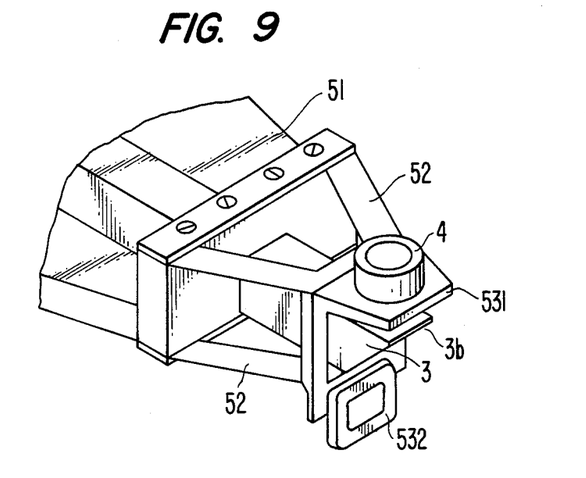
FIG. 9 is a perspective view of a focus suspension used in the second embodiment.
Figure 10A:
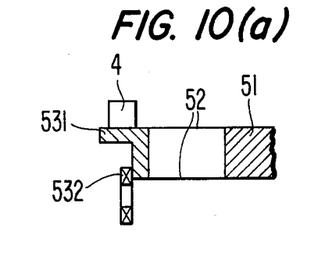
FIGS. 10a–10c show operations of the focus suspension of FIG. 9.
Figure 10B:
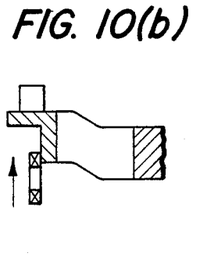
Figure 10C:
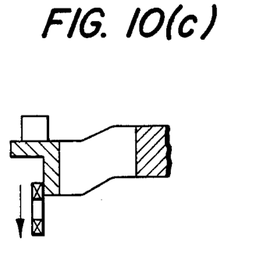

In this embodiment, the holder 531 is driven directly by the focusing direction drive motor 532 to thereby move the objective lens 4 in the focusing direction. The focus suspension 52 functions to restrict the movement of the objective lens 4 to one direction. A detailed sketch of the focus suspension 52 and its operation are shown in FIG. 9. The focus suspension 52 comprises two leaf springs which have the same size and shape and which are fixed at one end thereof to the holder 531 and at the other ends to the swing arm portion 51. Besides, the leaf springs are disposed in parallel with each other ([FIG. 10(a)]. They are deformed under an external force applied thereto. Since these springs try to deform themselves while maintaining their parallel relation, the holder 531 makes a parallel movement in the focusing direction [FIGS. 10(b) and 10(c)].

An attempt is made in this embodiment to minimize the conveyance mass, including the focusing direction drive means, during track seek. More specifically, the following two provisions are adopted: (1) the focusing direction drive motor 532 is constituted by only a coil in appearance and (2) the rotating means 5 is made smaller in shape toward the outer periphery from the center of rotation thereof. More concretely:

(1) The magnetic field required for the focusing direction drive motor 532 is supplied by a magnetic circuit 533 which is fixed on the base 10. The magnetic 533 has a structure which generates a uniform magnetic field along the track of the motor 532. Thus, by separating the magnetic circuit consisting principally of iron from the moving portion, a reduction in weight of the moving portion is realized.

(2) By adopting a construction in which the mass becomes smaller in proportion to the distance from the rotational axis, it is possible to diminish the moving mass of the entire rotary actuator. In view of this point there is adopted in this embodiment a construction in which the swing arm portion 51, focus suspension 52 and holder 531 are disposed in this order from the rotational center of the rotating means 5 toward the outer periphery and in which the focus suspension 52 is V-shaped and the holder 531 having reduced size and weight is provided at the fore end of the focus suspension.

In short, in this embodiment, the holder 531 is driven directly by the focusing direction drive motor 532 to thereby move the objective lens 4 in the focusing direction, and the swing arm portion 51 is rotated by the motor portion 50 to thereby move the objective lens 4 in the tracking direction. This method is also described in the prior art literature previously referred to (Japanese Laid-Open Patent Application No. 58-53035). But there arises a problem in using this technique, which problem is how "hard" and how "softly" the focus suspension is to be formed. More particularly, as to the focusing direction drive, it is desirable that the focus suspension 52 be as soft as possible because it acts as a reaction force against the focusing direction drive motor 532. But as to the tracking direction drive, it is desirable that the focus suspension 53 be as hard as possible because it transmits force to the objective lens 4. Where the focus suspension 52 is hard, the load on the focusing direction drive motor 532 becomes large. If the focus suspension 52 is soft, the rigidity in the tracking direction becomes weak and a mechanical resonance is created at a relatively low frequency.

The optical path deflecting means 2 reduces such restictions on the focus suspension 52. In the case where both the rotating means 5 and the optical path deflecting means 2 are used for the tracking control, a mechanical resonance in the rotating means 5 can be ignored if it is limited to a certain extent, and this is as explained in the first embodiment. Therefore, the focus suspension can be made somewhat weaker than in the prior art.

Figure 11A:
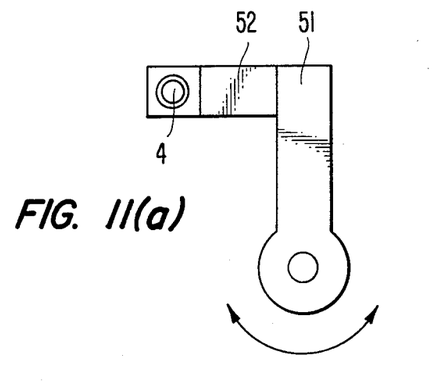
FIGS. 11a and 11b are explanatory views showing two examples of focus suspensions.
Figure 11B:
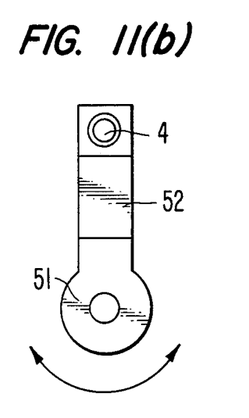

What is most important in this connection is that a weight-saving structure and a high rigidity structure are sometimes contrary to each other. FIGS. 11a and 11b show two examples of focus suspension. In this figure, FIG. 11(a) illustrates a feature of a conventional focus suspension, in which a driving force is transmitted in the direction of compression and expansion of the focus suspension to thereby move the objective lens 4, while FIG. 11(b) illustrates a feature of the focus suspension in this embodiment, in which a driving force is transmitted in the bending direction of the focus suspension to thereby move the objective lens 4. In point of stength of materials, a higher rigidity can be attained in FIG. 11(a), but a lighter construction can be attained in FIG. 11(b).

Such restrictions on design in the entire rotary actuator can be reduced by the use of the optical path deflecting means 2. More particularly, the rotary actuator may be reduced in weight to a great extent. Such a reduction in weight may cause a mechanical resonance of the rotary actuator, but the optical path deflecting means 2 will cover this influence.

The reason why the optical guide means 3 is constituted by a parallelogrammic prism is for shortening a substantial distance between the optical path deflecting means 2 and the objective lens 4. Because when the refractive index of the material of the parallelogrammic prism is n, the external length of the prism becomes 1/n. As a result of shortening of the substantial distance or the optical length, the optical axis deviation caused by a slight rotation of the optical path deflecting means 2 becomes still smaller.

Figure 12:
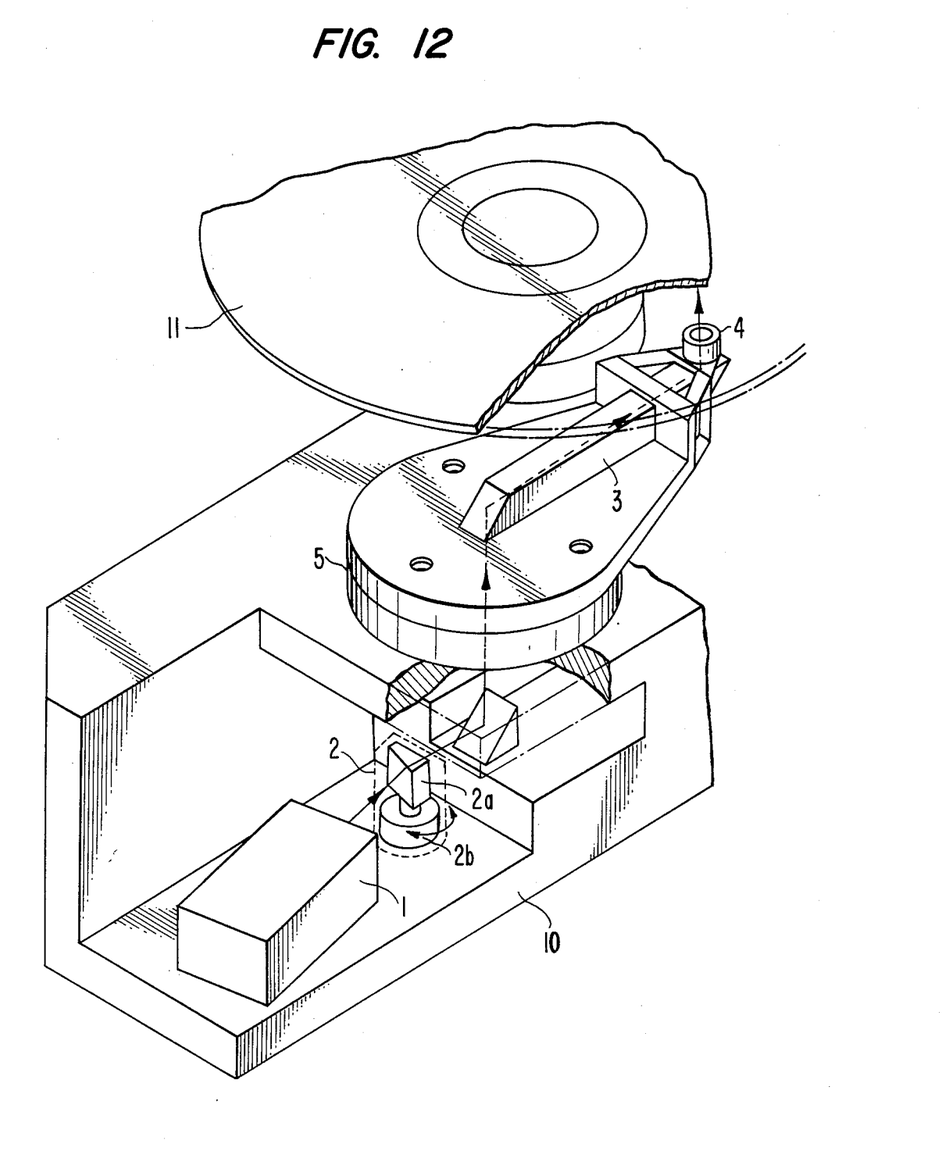
FIG. 12 is a perspective view of an optical disc drive apparatus according to a third embodiment of the present invention.

Referring now to FIG. 12, there is illustrated in perspective view an optical disc drive apparatus according to a third embodiment of the present invention, in which an optical path deflecting means 2 is composed of a prism 2a and a prism rotator 2b for rotating the prism 2a at a slight angle. Using the prism 2a and the prism rotator 2b in place of the galvanomirror brings about the following advantages.

In the optical disc apparatus of the present invention, the distance between the fine actuator and the objective lens is longer than that in the prior art. This causes no influence in the ordinary tracking operation as previously noted. However, in the event of an error in the optical posture of the precision actuator induced by an external impact force or vibration or by a secular change, there occurs a greater optical axis deviation than in the prior art and in which is in proportion to the larger optical length. In the present invention, therefore, it is necessary to use a fine actuator which is highly resistive to such disturbances.

Figure 13:
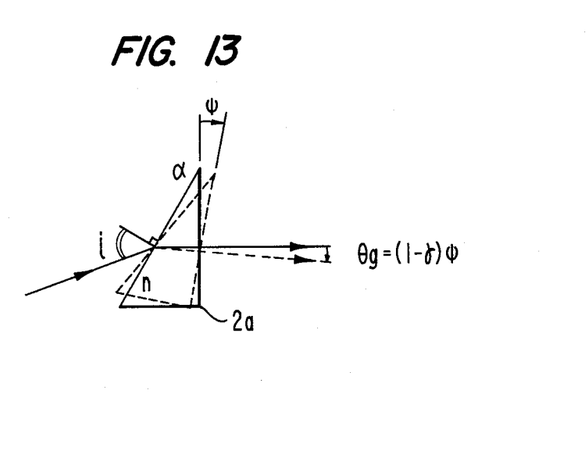
FIGS. 13 and 14 are diagrammatic explanatory views showing partial operations of the drive apparatus of FIG. 12.

Referring now to FIG. 13, there is illustrated the manner in which a transmitted light deflects upon rotation of the prism 2a. If the angle of rotation of the prism is $\psi$ and the angle of deflection of the transmitted light is $\theta g$, the relation of the two is given as:

$$\theta g = (1 - \gamma)\omega \qquad 12$$

$$\gamma = \frac{\cos i}{\cos\{\sin^{-1}(1/n \cdot \sin i)\}}$$

wherein i represents the angle of incidence of light beam and n represents the refractive index of the prism 2a, provided the vertical angle $\alpha$ of the prism is assumed to be:

$$\alpha = \sin^{-1}(1/n \cdot \sin i)$$

Figure 14:
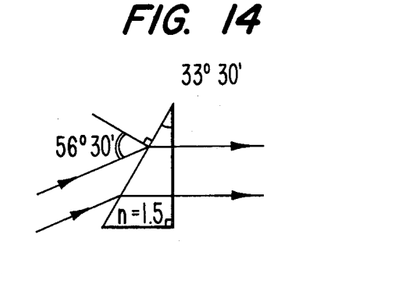

FIG. 14 shows an example. Substituting $i = 56°30'$ and $n = 1.5$ into the equation (13) gives:

$$\gamma = 0.66$$

$\theta g = 0.34 \psi$

In the case of a galvanomirror, the reflected light deflects twice the angle of rotation of the mirror, while in this case the transmitted light deflects only 0.34 times the angle of rotation of the prism. This means that about six-fold resistance to disturbance can be attained.

From the above it can be said that the optical path deflecting means 2 using the prism 2a and the prism rotator 2b is one of the most suitable fine actuators in this embodiment.

Figure 15:
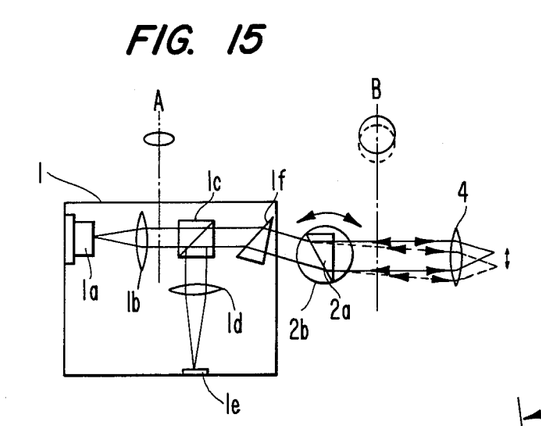
FIG. 15 is a partial construction diagram illustrating a fourth embodiment of the present invention.

A fourth embodiment of the present invention will now be described. FIG. 15 is a partial construction diagram of the fourth embodiment, in which 1a to 1f designate components of an optical system 1, 1a being a laser diode, 1b a collimator lens, 1c a half mirror, 1d a convex lens, 1e a light sensing element and 1f a prism. Light guide means 3 and rotating means 5 are omitted in accordance with the form of FIG. 3.

The prism functions not only to refract the light beam but also to expand and contract the beam diameter only in one direction. For example, in FIG. 13, the diameter of the beam after passing through the prism becomes $1/\gamma$. In the case of FIG. 14, the beam is expanded 1.52 times in one direction because $\gamma = 0.66$. If the prism 1f is also given a constant similar to that of the prism 2a, the beam diameter is expanded to $1/\gamma^2$, i.e. 2.3 times. By utilizing this property, an elliptic beam (A) emitted from the laser diode 1a can be shaped into a nearly circular beam (B).

The prism shape shown in FIG. 14 is used relatively frequently, provided the shape of prism is not always restricted to this shape. A prism with a magnifying ratio not less than 1.4 is fully employable in practical use as beam shaping means. Since beam shaping means is an essential component in a recording/reproducing type optical disc drive apparatus, the use of a portion thereof as a precision actuator is advantageous also in point of cost.

In this case, however, there is the following restriction on the place where the prism is to be disposed. The prism 2a having the function of causing an optical axis deviation must be disposed between the half mirror 1c and the objective lens 4. As long as it is located in this position, even in the event of occurrence of a slight optical axis deflection during precision tracking, it does not affect the optical axis of light incident on the light sensing element 1e, so it is possible to achieve stable focus and tracking controls.

Figure 16:
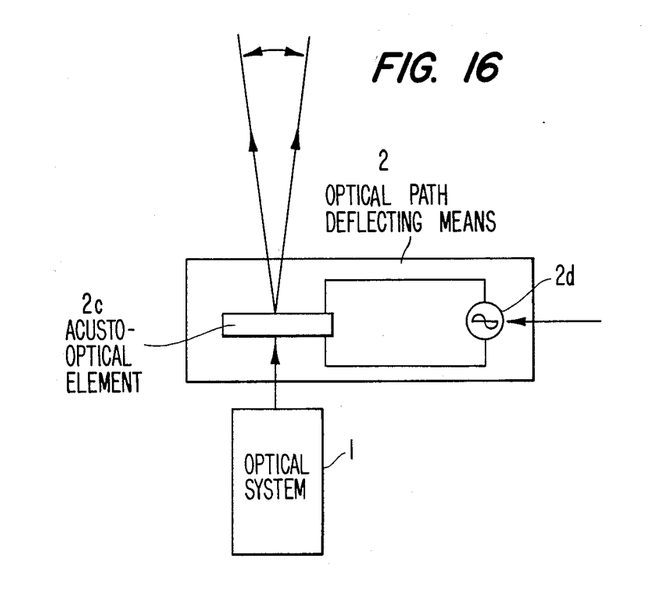
FIG. 16 is a partial construction diagram illustrating a fifth embodiment of the present invention.

A fifth embodiment of the present invention will now be described. FIG. 16 is a partial construction diagram of the fifth embodiment. The optical path deflecting means may be of the type in which an optical path is changed electrically. In this embodiment, therefore, an acousto-optical element 2c is used as the optical path deflecting means 2. A high frequency is applied to the acousto-optical element from an acoustic wave source 2d. By changing the frequency generated in the acoustic way source 2d it is possible to change the direction of transmitted light by a slight angle. If the frequency generated is controllable externally, the optical path deflecting means using the acousto-optical element 2c can be incorporated in the tracking control loop. Thus, by using an optical path deflecting means 2 of the type in which optical path can be changed directly with an electrical signal, it is possible to provide an optical disc drive apparatus which is not influenced at all by an external shock.

Other examples of the optical path deflecting means 2 will be described with reference to FIGS. 17 to 21.

Figure 17:
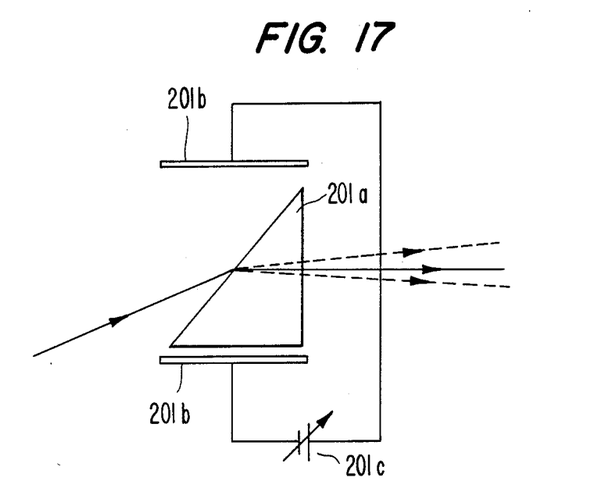
FIGS. 17 to 21 are schematic structural diagrams showing other examples of optical path deflecting means of the present invention.

Referring to FIG. 17, the optical path deflecting means 2 can be constituted by a prism 201a made of an electro-optic crystal and an electric field generator comprising a pair of electrodes 201b and a variable voltage source 201c. The light path through this prism 201a will be deflected by controlling the electric field. The prism 201a, of course, may be used as a shaping means.

Figure 18:
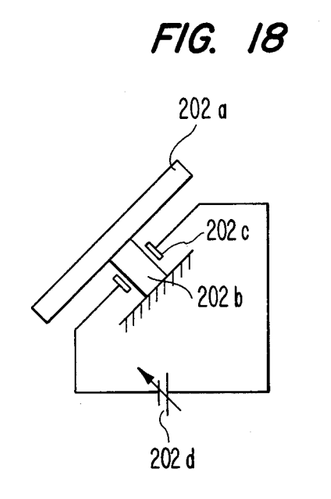

Referring to FIG. 18, the optical path deflecting means 2 can be constituted by a piezo crystal 202b, a mirror 202a provided on the piezo crystal 202b, and an electric field generator comprising a pair of electrodes 202c and a variable voltage source 202d. Although the range of movement of the piezo rotator is smaller than that of a magnetic one (constituted by a magnet and a coil), it is mechanically stronger with respect to an external impact.

Figure 19:
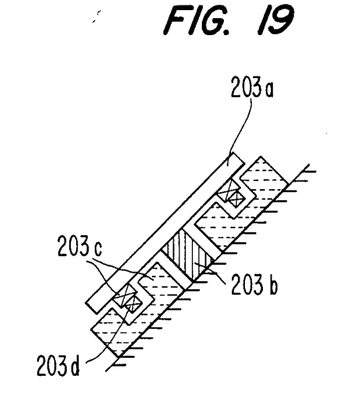
Figure 20:
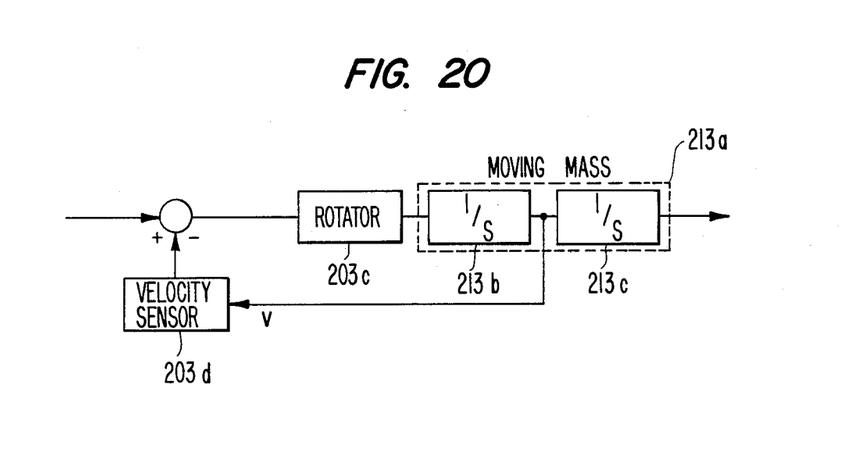

Referring to FIG. 19, the optical path deflecting means 2 is constituted by a mirror 203a, a rotator 203c, a velocity sensor 203d, and a suspension 203b. The rotator 203c is constituted by a coil and a magnetic circuit, and the velocity sensor 203d is constituted by a coil provided on the mirror 203a. The velocity sensor 203d is used for electrical damping. A quality factor (Q) at the first resonance frequency ($f_L$) of the optical path deflecting means 2 must be small enough because a large Q may cause unstability of the total system (see FIG. 4). The Q can be reduced using the velocity sensor 203d. FIG. 20 represents a block diagram of the electrical damping. Numeral 213a represents a moving mass containing a mirror 203a. Furthermore the moving mass 213a can be thought physically to contain two integral means 213b and 213c. The rotator 203c, the integral means 213b, and the velocity sensor 203d constitute a negative feed-back loop. The mirror 203a may be replaced by a prism.

Figure 21:
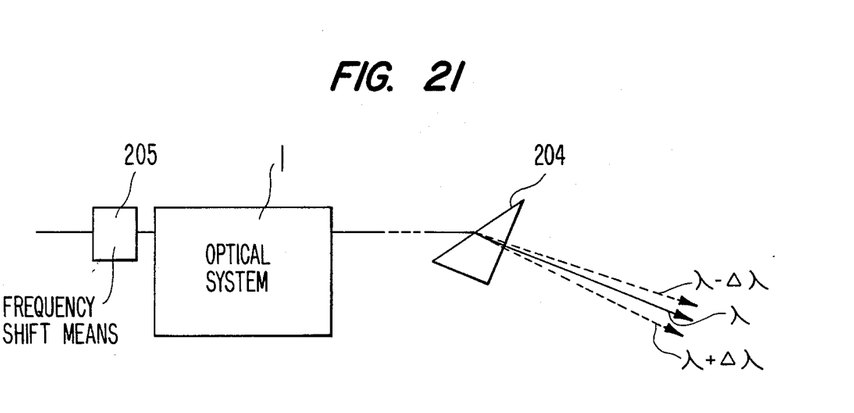

Referring to FIG. 21, the optical path deflecting means 2 is constituted by a prism 204 and a frequency shift means 205 which can vary the frequency of light. The refractions angle of the prism 204 depends on the wavelength of light. Therefore a light path through the prism 204 will be deflected if the wavelength of the incident beam is shifted by the frequency shift means 205. The frequency shift means 205 is not necessarily like an optical frequency modulator. It may be a kind of laser which can control the wavelength of its generated light.

There are many other modifications of the optical path deflecting means 2, which are all included within the scope of the present invention.

What is claimed is:

1. An optical disc drive apparatus comprising:
   an optical system having a light emitting means for emitting light;
   an objective lens for focusing the light emitted from said optical system to form a light spot on a surface of an optical disc on which information is recorded in information tracks;
   a rotatable means having a rotational axis along which the light emitted from said optical system passes and having said objective lens mounted thereon for causing said objective lens to move arcuately in a direction crossing the information tracks of said optical disc to allow the light spot to coarsely track the information tracks;

a light guide means mounted on said rotatable means for guiding the light passed along the rotational axis of said rotatable means to said objective lens; and an optical path deflecting means for receiving the light emitted directly from said optical system and passing the light along the rotational axis of said rotatable means and being movable for deflecting the light, said optical path deflecting means being mechanically isolated from said rotatable means and the movement being such as to allow the light spot to finely track the information tracks.

2. The apparatus according to claim 1, wherein said optical path deflecting means comprises a galvanomirror.

3. The apparatus according to claim 1, wherein said optical path deflecting means comprises a prism and a means for rotating said prism.

4. The apparatus according to claim 1, wherein said optical system further has a light sensing means for sensing light which is reflected from the surface of said optical disc and is guided by said objective lens, said light guide means and said optical path deflecting means back to said optical system.

5. The apparatus according to claim 4, further comprising a control means for controlling said rotatable means and said optical path deflecting means in parallel in accordance with a tracking error signal obtained from said optical system, said control means comprising a first control system for transmitting the tracking error signal obtained from said optical system to said rotatable means through a primary low pass filter and a second control system for transmitting said tracking error signal to said optical path deflecting means through a primary lead lag filter which advances the phase of a frequency band located between frequencies $f_{p1}$ and $f_{p2}$; $f_{p1} < f_{p2}$; said first control system having a zero gain at a frequency of about 500 Hz or higher, and said optical path deflecting means having a frequency response characteristic which exhibits a secondary characteristic having a cut-off frequency $f_g$; and said first and second control systems having transfer functions crossing each other at a frequency $f_T$, and wherein:

$$f_g < f_T < f_{p1}.$$

6. An optical disc drive apparaus comprising:
an optical system having a light emitting means for emitting light;
an objective lens for focusing the light emitted from said optical system to form a light spot on a surface of an optical disc on which information is recorded in information tracks;
a rotatable means having a rotational axis along which the light emitted from said optical system passes and having said objective lens mounted thereon for causing said objective lens to move arcuately in a direction crossing the information tracks of said optical disc to allow the light spot to coarsely track the information tracks;
a light guide means mounted on said rotatable means and having a first reflecting surface at a position on the rotational axis of said rotatable means for reflecting the light passed along the rotational axis and a second reflecting surface for reflecting the reflected light from said first reflecting surface in a direction parallel to the rotational axis of said rotatable means to said objective lens, said objective lens focusing the reflected light from said second reflecting surface to form the light spot; and an optical path deflecting means for receiving the light emitted directly from said optical system and passing the light along the rotational axis of said rotatable means and being movable for deflecting the light, said optical path deflecting means being mechanically isolated from said rotatable means and the movement being such as to allow the light spot to finely track the information tracks.

7. The apparatus according to claim 6, wherein said optical path deflecting means comprises a galvanomirror.

8. The apparatus according to claim 6, wherein said optical path deflecting means comprises a prism and a means for rotating said prism.

9. The apparatus according to claim 6, wherein said optical system further has a light sensing means for sensing light which is reflected from the surface of said optical disc and is guided by said objective lens, said light guide means and said optical path deflecting means back to said optical system.

10. The apparatus according to claim 9, further comprising a control means for controlling said rotatable means and said optical path deflecting means in parallel in accordance with a tracking error signal obtained from said optical system, said control means comprising a first control system for transmitting the tracking error signal obtained from said optical system to said rotatable means through a primary low pass filter and a second control system for transmitting said tracking error signal to said optical path deflecting means through a primary lead lag filter which advances the phase of a frequency band located between frequencies $f_{p1}$ and $f_{p2}$; $f_{p1} < f_{p2}$;

said first control system having zero gain at a frequency of about 500 Hz or higher, and said optical path deflecting means having a frequency response characteristic which exhibits a secondary characteristic having a cut-off frequency $f_g$; and
said first and second control systems having transfer functions crossing each other at a frequency $f_T$, and wherein:

$$f_g < f_T < f_{p1}.$$

11. The apparatus according to claim 6, wherein said light guide means comprises two reflecting members which are opposed and in parallel with each other.

12. The apparatus according to claim 6, wherein said light guide means comprises a parallelogramic prism having two total reflection surfaces which are opposed and in parallel with each other.

13. An optical disc drive apparatus comprising:
an optical system having a light emitting means for emitting light;
an objective lens for focusing the light emitted from said optical system to form a light spot on a surface of an optical disc on which information is recorded in information tracks;
a rotatable arm having a rotational axis along which the light emitted from said optical system passes and a free end movable arcuately in a direction crossing the information tracks of said optical disc;
a support member for supporting said objective lens on said free end of said rotatable arm so that said objective lens moves arcuately in the direction crossing the information tracks of said optical disc to allow the light spot to coarsely track the information tracks, said supporting member being resilient for allowing said objective lens to move in a direction perpendicular to the surface of said optical disc;

a means for moving said objective lens in the direction perpendicular to the surface of said optical disc to adjust focusing of the light spot;

a light guide means mounted on said rotatable means and having a first reflecting surface at a position on the rotational axis of said rotational axis and a second reflecting surface at a position near said objective lens for reflecting the reflected light from said first reflecting surface in a direction parallel to the rotational axis of said rotatable arm to said objective lens, said objective lens focusing the reflected light from said second reflecting surface to form the light spot; and an optical path deflecting means for receiving the light emitted directly from said optical system and passing the light along the rotational axis of said rotatable arm and being movable for deflecting the light, said optical path deflecting means being mechanically isolated from said rotatable arm and the movement being such as to allow the light spot to finely track the information tracks.

14. The apparatus according to claim 13, wherein said optical path deflecting means comprises a galvanomirror.

15. The apparatus according to claim 13, wherein said optical path deflecting means comprises a prism and a means for rotating said prism.

16. The apparatus according to claim 13, wherein said optical system further has a light sensing means for sensing light which is reflected from the surface of said optical disc and is guided by said objective lens, said light guide means and said optical path deflecting means back to said optical system.

17. The apparatus according to claim 16, further comprising a control means which controls said rotatable arm and said optical path deflecting means in parallel in accordance with a tracking error signal obtained from said optical system, said control means comprising a first control system for transmitting the tracking error signal obtained from said optical system to said rotatable means through a primary low pass filter and a second control system for transmitting said tracking error signal to said optical path deflecting means through a primary lead lag filter which advances the phase of a frequency band located between frequencies $f_{p1}$ and $f_{p2}$; $f_{p1} < f_{p2}$;

said first control system having zero gain at a frequency of about 500 Hz or higher, and said optical path deflecting means having a frequency response characteristic which exhibits a secondary characteristic having a cut-off frequency $f_g$; and said first and second control systems having transfer functions crossing each other at a frequency $f_T$, and wherein:

$$f_g < f_T < f_{p1}.$$

18. The apparatus according to claim 13, wherein said light guide means comprises a parallelogramic prism having two total reflection surfaces which are opposed and in parallel with each other.

19. The apparatus according to claim 13, wherein said resilient support member is tapered from said rotatable arm toward said objective lens.

* * * * *